United States Patent [19]

Baumbach

[11] 4,098,287
[45] Jul. 4, 1978

[54] DRAIN CONTROL DEVICE

[76] Inventor: William J. Baumbach, 11612 Fairfax Station Rd., Fairfax Station, Va. 22039

[21] Appl. No.: 672,961

[22] Filed: Apr. 2, 1976

[51] Int. Cl.² ............................................ F16K 15/14
[52] U.S. Cl. ................................. 137/362; 137/454.2; 137/849
[58] Field of Search ................. 137/362, 454.2, 454.4, 137/846, 847, 849, 850

[56] References Cited

U.S. PATENT DOCUMENTS

| Re. 27,399 | 6/1972 | Urso | 137/850 X |
|---|---|---|---|
| 1,753,724 | 4/1930 | Shaw | 137/454.2 X |
| 3,047,013 | 7/1962 | Baumbach | 137/849 |
| 3,107,687 | 10/1963 | Howe | 137/362 |
| 3,118,468 | 1/1964 | Bochan | 137/846 |
| 3,565,106 | 2/1971 | Baumbach | 137/847 X |

*Primary Examiner*—Robert G. Nilson
*Attorney, Agent, or Firm*—Clarence A. O'Brien; Harvey B. Jacobson

[57] ABSTRACT

A drain control device adapted to be installed in a floor drain or the like and includes a device which prevents the backflow of water or other flowable material up through the floor drain. An expandable annular member is sealingly engaged with a floor drainpipe and includes a depending generally conical body divided into a plurality of circumferentially spaced and longitudinally extending segments capable of extension and contraction to enable flow in one direction and prevent backflow. A funnel-shaped device is inserted into the upper end of the drain control for guiding material downwardly into the drain control and preventing such material from becoming lodged on the upper end of the annular, peripherally expandable resilient body.

5 Claims, 4 Drawing Figures

DRAIN CONTROL DEVICE

BACKGROUND OF THE INVENTION

1. Field of the Invention

The present invention generally relates to a floor drain control device which can be inserted into and sealed in relation to a floor drain without modification of existing floor drains and which will permit flow of water or other liquids downwardly through the drain in a conventional manner but prevent backflow of flowable material up through the floor drain.

2. Description of the Prior Art

Problems relating to flooding of basements or similar areas in homes or other buildings by backflow of water through the floor drain is a well known and continuing problem. Efforts have been made to overcome this problem by installation of check valves, standpipes, plugs and the like. While such devices have been successful to some degree, if a plug is not installed or not properly installed, it will not be effective. Check valves also have been found to be ineffective since it frequently occurs that dirt or other similar material prevents the valve from fully closing against its valve seat and standpipes are only effective when some means is provided for closing the floor drain. My prior U.S. Pat. Nos. 3,047,013, issued July 31, 1962 and 3,565,106, issued Feb. 23, 1971 disclose diaphragm type control devices to enable one-way fluid flow and have been found effective over a long period to dependably enable flow in one direction and prevent flow in a reverse direction in which a generally conical resilient member is provided with radial vanes defining expandable segments which can expand when flow from the base toward the apex of the conical member occurs and contracts and remains closed when flow from the apex toward the base of the conical member occurs.

SUMMARY OF THE INVENTION

An object of the present invention is to provide a floor drain control device insertable into and sealingly engaged with the interior of a floor drain to prevent backflow of water through the drain.

Another object of the invention is to provide a floor drain control device in the form of a peripherally expandable resilient body of generally cylindrical configuration which can be inserted into the pipe of a floor drain and longitudinally compressed for expanding the body into sealing engagement with the interior of the floor drain pipe to enable installation of the control device without modification of existing drain structures.

Still another object of the invention is to provide a floor drain control device provided with a funnel-shaped adapter having a larger upper end received in the floor drain pipe in overlying relation to the inserted annular body to guide flowable material through the annular body and prevent such material from becoming lodged on the upper end of the annular body.

Yet another important object of the present invention is to provide a floor drain control device in which the resilient annular body is provided with an integral depending conical, diaphragm type valve in which the conical valve includes a resilient body having radial vanes capable of being expanded and contracted in response to flow conditions therethrough to provide a one-way flow valve thereby preventing backflow through the drain.

Still another important object of the present invention is to provide a floor drain control device in accordance with the preceding objects which is simple in construction, easy to install and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
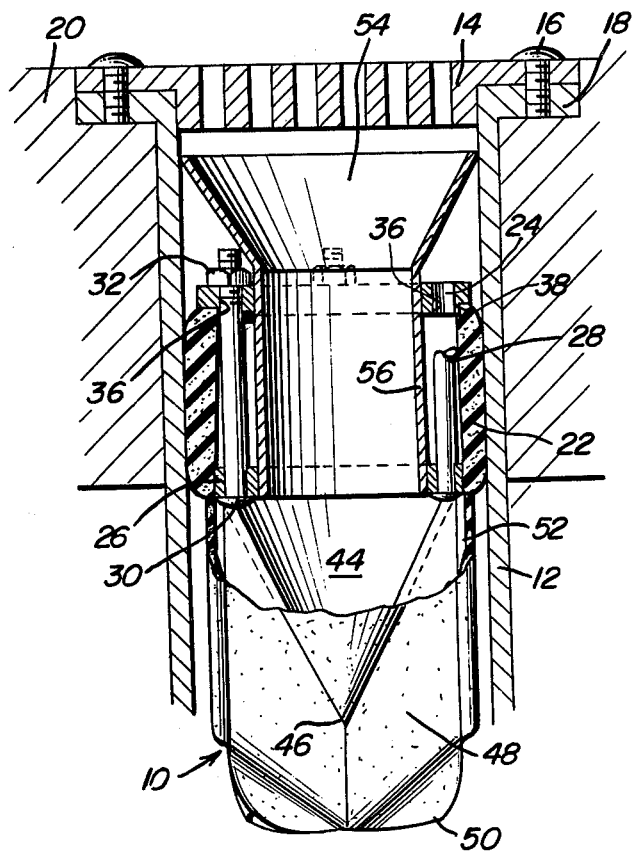
FIG. 1 is a sectional view of a floor drain with the drain control device of the present invention incorporated therein.
Figure 2:
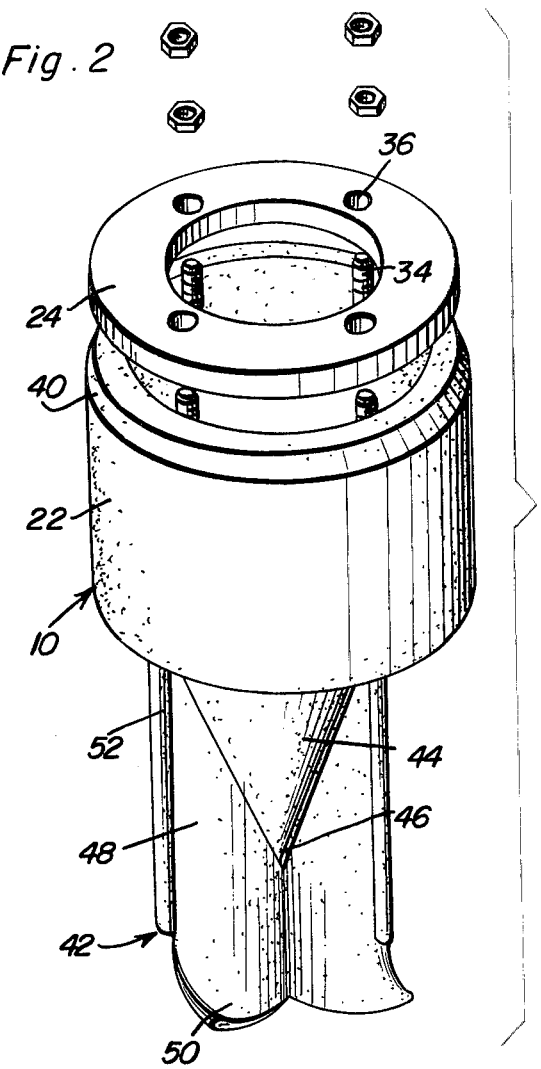
FIG. 2 is a perspective view of the floor drain control device with portions exploded therefrom.

Referring now specifically to the drawings, the drain control device of the present invention is generally designated by the numeral 10 and is illustrated installed in a floor drainpipe having the usual grate 14 removably secured thereto by conventional means such as fasteners 16 or the like. The pipe 12 may be secured to a peripheral flange 18 or the flange may be integral with the pipe with the entire floor drain assembly being constructed so that it is substantially flush with a floor 20 such as a concrete basement floor or the like. The specific construction of the drain including the drainpipe and its association with the grate represent conventional components employed in various types of buildings with the drain control 10 of the present invention being installed therein without modification whatsoever with it only being necessary to temporarily remove the inlet grate or other structure which enables water or other flowable liquid to drain into the drainpipe 12 which may be connected to a suitable sewer, dry well or other suitable facility by which the water or other liquid may be disposed of.

The drain control device 10 of the present invention includes a generally cylindrical, annular body 22 of resilient material such as rubber that has an external dimension that enables it to be inserted downwardly into the drainpipe 12 with the external perimeter of the body 22 being closely received in the pipe 12 but slightly less in diameter so that it can be easily inserted into the pipe. The resilient cylindrical body 22 is then longitudinally compressed which will expand the body 22 circumferentially into sealing and mounting engagement with the interior of the drainpipe 12 as illustrated in FIG. 1.

In order to circumferentially expand the resilient body 22, an upper annular ring 24 engages the upper end of the body 22 and a lower annular ring 26 is fixedly secured to the interior of the annular body 22 with the two rings 24 and 26 being movable toward each other by the use of fastening bolts having a head 30 at the lower end thereof and a nut 32 threaded onto the threaded upper end 34 of the bolt 28. The upper annular ring 24 is provided with a plurality of apertures 36 which receive the upper ends of the bolts 28 and the bottom surface of the ring 24 is provided with an offset shoulder 38 just outwardly of the bolts 28 which engages the inner edge of the upper end of the body 22 in order to centralize the ring 24 in relation thereto. The diameter of the ring 24 at the exterior thereof is less than the pipe 12 and the upper outer corner of the body 22 is chamfered as at 40 to better enable the expansion of the upper end portion of the cylindrical resilient body 22 as the effective length of the bolts 28 is shortened when the nuts 32 are threaded downwardly by a suitable implement such as a ratchet wrench or the like.

The lower end of the cylindrical resilient body 22 is fixedly secured to the lower ring 26 as by the rubber being embedded at least partially around the bottom portion of the ring so that it, in effect, becomes integral with the ring. This molding of the rubber material around the bottom of the ring also encapuslates the heads 30 of the bolts 28 and prevents the heads from rotating. The specific construction of the bolts may be varied and other types of screw-threaded fasteners may be employed for moving the upper and lower rings 24 and 26 towards each other while maintaining the peripheral integrity of the cylindrical body 22 and expanding the cylindrical body into sealing and locking engagement with the interior of the drainpipe 12.

Forming an integral depending extension of the cylindrical body 22 is a diaphragm type of valve construction generally designated by numeral 42 and which includes a generally conical body 44 having its upper large end unitary with the lower end portion of the resilient cylindrical body 22 with the conical body tapering down to an apex 46 adjacent the lower end thereof. The structure of the conical body 44 is substantially the same as that disclosed in my prior U.S. Pat. No. 3,565,106, issued Feb. 23, 1971, which disclosure is incorporated herein by reference thereto. The conical body 44 includes a plurality of vanes 48 each of which is defined by a pair of flexible resilient panels integral with an adjacent corresponding portion of the conical body 44 thus defining entrance slits or areas communicating with the interior of the conical body and forming an expansion area for enabling the conical body 44 to expand, particularly, in the lower end portion thereof inasmuch as the vanes 48 have their inner edges corresponding to the slope of the conical body 44 and their outer edge extending substantially parallel with the centerline of the conical body 44.

The vanes 48 extend below the apex 46 and terminate in a spirally deformed outer corner portion 50 which extends spirally in a clockwise direction as observed in FIG. 3. Also, each vane is provided with a reinforcing rod or pin 52 along the outer edge thereof from a point generally in alignment with the lower apex 46 up to where the upper end of the conical body 44 joins with the lower end portion of the cylindrical body 22.

Figure 3:
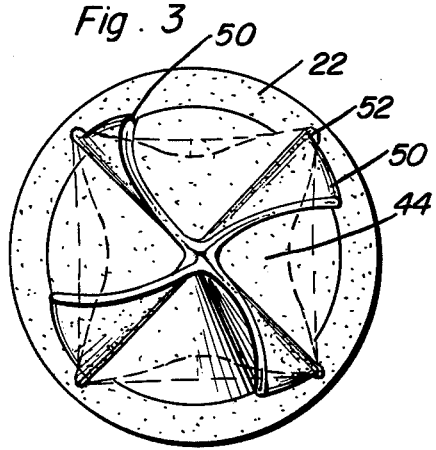
FIG. 3 is a bottom plan view of the control device when the vanes are in their normal condition.
Figure 4:
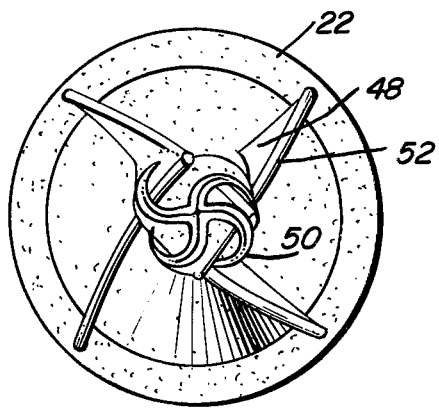
FIG. 4 is a bottom plan view of the control device when the vanes are collapsed or retracted as would occur when encountering reverse flow of fluid.

The cylindrical body 22 as well as the conical body 44, vanes 48 and covering for the reinforcing rods 52 are of one-piece construction of a noncorrosive material such as natural or synthetic rubber, plastic or the like with FIGS. 3 and 4 illustrating the collapse of the lower ends of the vanes into a closed, spirally twisted relation which occurs when upward fluid flow occurs in the pipe 12 thereby forming a closure for the drainpipe with the reinforcing rods preventing the conical body from turning inside out or everting when backflow pressure occurs in the drain line thereby preventing backflow of liquid into the area above the floor 20.

A funnel-shaped member 54 is disposed in the pipe 12 above the drain control device 10 and includes an upper end having a diameter substantially the same as the internal diameter of the pipe 12 for close-fitting engagement therein so that any liquid passing through the openings in the drain grate 14 will be collected by the funnel 54. The lower end of the funnel includes a cylindrical extension 56 which extends substantially throughout the length of the cylindrical body 22 so that liquid material passing through the body 22 will not become collected on the upper surface of the upper ring 24 or the upper surface of the lower ring 26. The funnel 54 may be of plastic material or the like and can be inserted into the control device 10 after it has been installed in the drain opening 12.

The device may be provided in various standard sizes and when installed in new construction, the drainpipe may be provided with a suitable larger diameter nipple or the like which will enable the control device to be provided with an internal diameter substantially equal to the internal diameter of the remainder of the drainpipe. This, in effect, provides an enlarged segment of a drainpipe for receiving the drain control device which can be installed during assembly of the drainpipe such as prior to a concrete floor being poured. Also, while the device has been illustrated in use in a floor drain, it may be inserted into any type of flow pipe in which one way fluid flow is desired. The expandable body enables easy installation as well as easy removal and replacement when desired or necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A floor drain control device comprising a generally cylindrical resilient body adapted to be inserted into a floor drainpipe, means connected to said body for longitudinal compression thereof for circumferentially expanding the body into sealing and mounting engagement with the interior of a drainpipe, a depending conical body of flexible resilient material integral with the cylindrical body and including a plurality of radial vanes integral therewith to enable expansion and contraction of the conical body for enabling passage of liquid passing downwardly through the drainpipe but preventing backflow of liquid up through the drainpipe, said means connected with the cylindrical body for longitudinal compression thereof including a rigid annular ring at the upper end of said cylindrical body and a rigid annular ring at the lower end of said body and being connected thereto, threaded members interconnecting said rings for moving said rings toward and away from each other for enabling expansion of the cylindrical body, and a funnel insertable into the upper end of the cylindrical body, said funnel including an upper end portion having a major diameter upper end larger than the internal diameter of the cylindrical body and a lower end portion of cylindrical configuration extending downwardly into the interior of the cylindrical body and having a diameter substantially equal to the internal diameter of the annular ring for guiding liquid material into the conical portion of the control device.

2. The structure as defined in claim 1 wherein said vanes include reinforcing means along the outer edge thereof to prevent eversion, each of said vanes extending below the lower tip end of the conical body and terminating in a spiral offset outer corner so that the vanes will collapse in a spiral manner when backflow pressure is exerted thereon.

3. The structure as defined in claim 2 wherein said threaded workers for longitudinally compressing the cylindrical member are accessible from the upper end of the cylindrical member to enable insertion of the control device be removing a floor drain grate and insertion of the control device into the drainpipe from the floor surface without alteration of the floor drain.

4. A flow control device adapted to be inserted longitudinally into a flow conduit having substantially constant internal dimensions, comprising an annular body of resilient material, said resilient body having a substantial longitudinal dimension paralleling the interior of the conduit, means connected with said body to lonitudinally compress the body to expand the body radially outwardly into sealing and mounting engagement with the interior of the conduit with the expanding engagement of the body with the interior of the conduit forming the sole means for mounting said body in the conduit, and a generally conical, resiliently flexible, one-way valve defining member extending unitarily from one end of said body, said valve defining member including a plurality of radially extending vanes each having normally adjacent walls extending radially outwardly from the conical member with the radial outer edges of the walls being connected to enable expansion of the vanes and conical member when flow occurs from the body toward the apex of the conical member, said vanes extending longitudinally of the conical member with the end edges of the walls addjacent the apex of the conical member being free to enable enlargement of the apex of the conical member during flow from the body to the apex, the free end edges of the walls normally being engaged with each other and the apex of the conical member normally being closed to prevent flow in the conduit from the apex toward the body, said means connected with the body to compress same including longitudinally spaced, substantially rigid annular members on the end portions of said body, and a plurality of screw threaded assemblies interconnecting the annular members for selectively moving said annular members toward and away from each other for expanding or contracting the body, said assemblies being accessible from the end portion of a conduit.

5. A flow control device adapted to be inserted longitudinally into a flow conduit having substantially constant internal dimensions, comprising an annular body of resilient material, said resilient body having a substantial longitudinal dimension paralleling the interior of the conduit, means connected with said body to longitudinally compress the body to expand the body radially outwardly into sealing and mounting engagement with the interior of the conduit with the expanding engagement of the body with the interior of the conduit forming the sole means for mounting said body in the conduit, and a generally conical, resiliently flexible, one-way valve defining member extending from one end of said body, said valve defining member including a plurality of radially extending vanes each having normally adjacent walls extending radially outwardly from the conical member with the radial outer edges of the walls being connected to enable expansion of the vanes and conical member when flow occurs from the body toward the apex of the conical member, said vanes extending longitudinally of the conical member with the end edges of the walls adjacent the apex of the conical member being free to enable enlargement of the apex of the conical member during flow from the body to the apex, the free end edges of the walls normally being engaged with each other and the apex of the concial member normally being closed to prevent flow in the conduit from the apex toward the body, said means connected with the body to compress same including longitudinally spaced, substantially rigid annular members on the end portions of said body, and a plurality of screw threaded assemblies interconnecting the annular members for selectively moving said annular members toward and away from each other for expanding or contracting the body, said assemblies being accessible from the end portion of a conduit and a funnel inserted into the end of the body remote from the conical member, said funnel having a major perimeter closely associated with the interior of the conduit and a minor perimeter extending interiorly of the body substantially throughout the length thereof to guide flow into said annular body.

* * * * *